United States Patent [19]
Kriz

[11] Patent Number: 4,941,086
[45] Date of Patent: Jul. 10, 1990

[54] PROGRAM CONTROLLED BUS ARBITRATION FOR A DISTRIBUTED ARRAY PROCESSING SYSTEM

[75] Inventor: Thomas A. Kriz, Sandy Hook, Conn.

[73] Assignee: International Business Machines Corporation, Armonk, N.Y.

[21] Appl. No.: 576,303

[22] Filed: Feb. 2, 1984

[51] Int. Cl.$^5$ .................................... G06F 13/364
[52] U.S. Cl. ............................ 364/200; 340/825.5
[58] Field of Search .................. 340/825.5, 825.51; 364/200, 900

[56] References Cited

U.S. PATENT DOCUMENTS

| | | | |
|---|---|---|---|
| 3,925,766 | 12/1975 | Bardotti et al. | 364/200 |
| 4,237,534 | 12/1980 | Felix | 364/200 |
| 4,400,771 | 8/1983 | Suzuki et al. | 364/200 |
| 4,488,218 | 12/1984 | Grimes | 364/200 |
| 4,495,567 | 1/1985 | Treen | 364/200 |
| 4,536,839 | 8/1985 | Shah et al. | 364/200 |

Primary Examiner—David L. Clark
Attorney, Agent, or Firm—Douglas R. McKechnie

[57] ABSTRACT

A distributed array processing system includes a bus divided into two portions or segments by a switch. One segment is connected to a processor and to a bus arbiter for controlling use of the bus. The bus arbiter provides one source of bus grant signals. A control register provides a second source of bus grant signals and additional signals for disabling the arbiter and actuating the switch. The control register is software controlled, i.e., it is loadable with data or control signals, under program control, to control use of the bus.

5 Claims, 4 Drawing Sheets

PROGRAM CONTROLLED BUS ARBITRATION FOR A DISTRIBUTED ARRAY PROCESSING SYSTEM

This invention relates to improvements in data processing systems of the type having an arbiter for controlling the use of a bus by various devices connected to it, which improvements are particularly useful in a distributed array processing system. More particularly, it relates to a program or software controlled bus arbitration system.

BACKGROUND OF THE INVENTION

The invention was designed as an improvement over two areas of the prior art. The first area concerns bus arbiters which in a given system provide hardware controlled, predetermined arbitration. The improvement to this area results in a more versatile, flexible system provided by the addition of software control of the arbiter and bus.

The second area involves the application of the first area to a distributed array processing system to provide a high degree of simultaneous, overlapped processing. Both of these areas are further explained in more detail below.

The architecture of the IBM Instruments Computer System, Type 9000, commercially available from IBM Instruments Inc., Danbury, Conn., is based on a Motorola MC68000 16-bit microprocessor. Such system includes a system bus connected to the processor, to a random access memory, and to a variety of modules or devices that transfer data over the bus under the control of the processor and a bus arbiter. The arbiter has prioritized input lines connected respectively to the various devices according to a desired order of priority. The arbiter also has output lines respectively connected to the devices.

In the operation of such system, the processor has the lowest priority for use by the bus and it can use the bus only when no request has been made from any of the other devices. Bus requests are made asynchronously by the requesting devices and it is necessary to complete the current bus cycle before a new request can be honored. When more than one bus request is made, at any given time, the arbiter decides which device will be granted control over the bus or become the master thereof, and a single bus grant signal is sent to such device allowing the transfer to be made. The device, when it exercises control, places a bus grant acknowledge signal on the bus. While the operation of such system is quite satisfactory for most applications, there nevertheless appears to be certain applications where it is desirable to be able to either override the arbiter or disable it so as to grant use of the bus selectively to a given device regardless of its normal priority. There are also times when it is desirable to effectively mask out bus request signals.

The array processing system embodying the invention is designed to use the above mentioned IBM Instruments Computer System as a host system and includes an array processor connected to the host system in a distributed processing network or system. Such array processing system is designed as a very low cost one, for performing a variety of the array operations like those of in the IBM 3838 Array Processor. The general nature of the new array processing system, however, requires problem programs to be executed, not in the host system as with the 3838, but in the array processor itself. To accomplish this operation, the array processor includes a process control unit (PCU), an arithmetic unit (AU), storage and a data transfer controller (DTC), interconnected with each other and the host system via a network of buses. To achieve high performance, the system operates in a highly overlapped fashion to carry out simultaneous functions. The high degree of overlap is partially accomplished by interconnecting the various buses through selectively enabled redrivers or switches which function to selectively electrically connect or isolate the buses.

While the preceding paragraph describes the general environment of the invention, the more specific environment involves control of the PCU master port and its bus segment via the PCU bus arbiter. The PCU generally provides the primary level of control of the array processor via a bus network structure which exists both within and outside of the PCU. However, the PCU arbiter which controls disposition of the PCU Master Port resources can itself limit flexibility of operation, unless some means is provided to allow PCU software interaction with bus arbitration activity. In general, this means facility to generate bus grants and to mask hardware input bus requests as a function of PCU software execution.

SUMMARY OF THE INVENTION

In view of the foregoing, one of the objects of the invention is to provide a data processing system, having a plurality of units connected to an arbiter controlled bus, with means for disabling the arbiter to grant use of the bus to a device, without resorting to an arbitration process.

Another object of the invention is to provide means to control the bus not only by use of an arbiter but also under software or program control. In other words, the use of the bus is selectively under both hardware and software control.

Still another object is to provide means for disabling an arbiter and concurrently controlling the electrical connection and isolation between the associated bus and an additional bus.

A further object is to selectively generate software controlled bus grant conditions to external devices.

Another object is to selectively partition a bus connected to locally owned resources, to be released under software controlled bus grant conditions.

A still further object is to selectively mask hardware controlled bus requests inputted to an arbiter.

Another object is to provide a low cost distributed array processing system having a high degree of overlap in the functions performed by a plurality of units interconnected by a bus network the use of at least a portion thereof is under the control of an arbiter and software.

Briefly, in accordance with the invention, a distributed processing system has plural buses interconnected by selectively controlled switches. One primary bus is connected to an arbiter which provides one source of bus grant signals. A control register provides a second source of bus grant signals and additional signals for disabling the arbiter and actuating the switches. The control register is software controlled, i.e., it is loadable with data or control signals, under program control, to operate in the desired manner.

DRAWINGS

Other objects and advantages of the invention will be apparent from the following description taken in connection with the accompanying drawings wherein.

Figure 1:
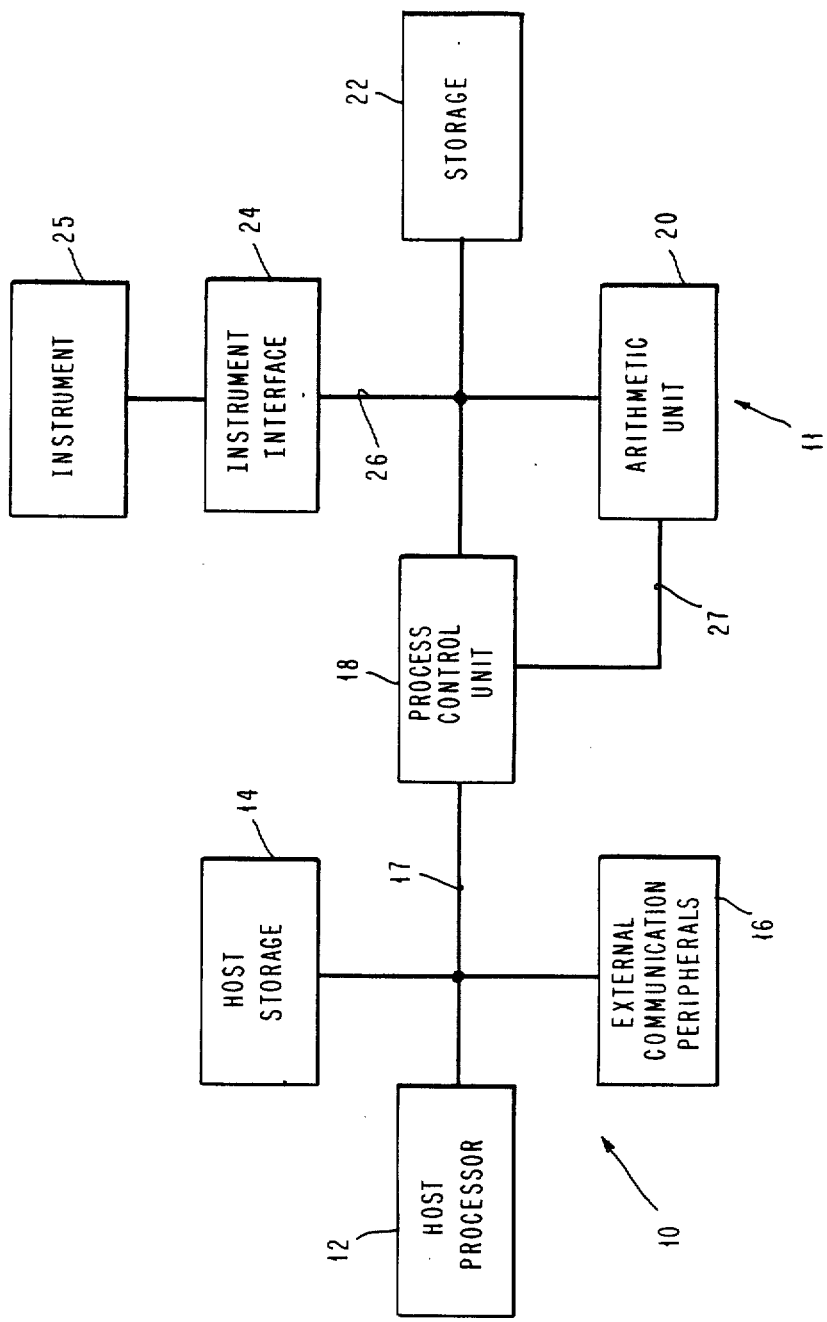
FIG. 1 is a schematic block diagram of a distributed processing system embodying the invention.

Referring now to the drawings, FIG. 1 shows a distributed processing system comprising a host system (HS) 10 and an array processing system (APS) 11. Host system 10 includes a host processor 12, host storage 14, and external communication peripherals 16 interconnected by a system bus 17. Peripherals 16 include conventional devices such as a printer, CRT display, RS 232 and IEEE 488 interfaces, etc. The host system 10 is preferably an IBM Instruments Computer System, discussed above.

APS 11 includes a process control unit (PCU) 18 for controlling operation of the array processing system. APS 11 further includes a high speed arithmetic unit (AU) 20 for performing array operations, and storage 22 for storing information including array operands or vectors. PCU 18 is connected to AU 20 by two buses 26 and 27. Storage 22 is also connected to bus 26. The system further optionally includes an instrument interface 24 and an instrument 25 which generate the type of data for which array operations are needed to analyze the data.

In the operation of the system thus far described, HS10 provides the overall distributed processing system control. However, relative to array operations, user or problem programs for executing or performing the array operations are executed, not in host processor 12, but in PCU 18. HS10 initiates the operations and either downloads a problem program into the PCU or passes a pointer to the PCU for loading a problem program from storage 22 into the PCU. This overall distributed array processing function where the array operations are carried out in APS 11, allows the host system to simultaneously perform other functions such as general housekeeping functions, monitoring operation of the instrument, (except for the data gathering portion) and outputting data once analyzed in system 11, through peripherals 16. Thus, the host system does not interfere with the array operations and is able to effectively overlap control, communication, I/O, etc., functions without degrading or creating a bottleneck for the high speed flow of array operands. This explanation of the general operation of the system is intended to generally illustrate the environment in which the invention, discussed in more detail below, is utilized.

Figure 2A:
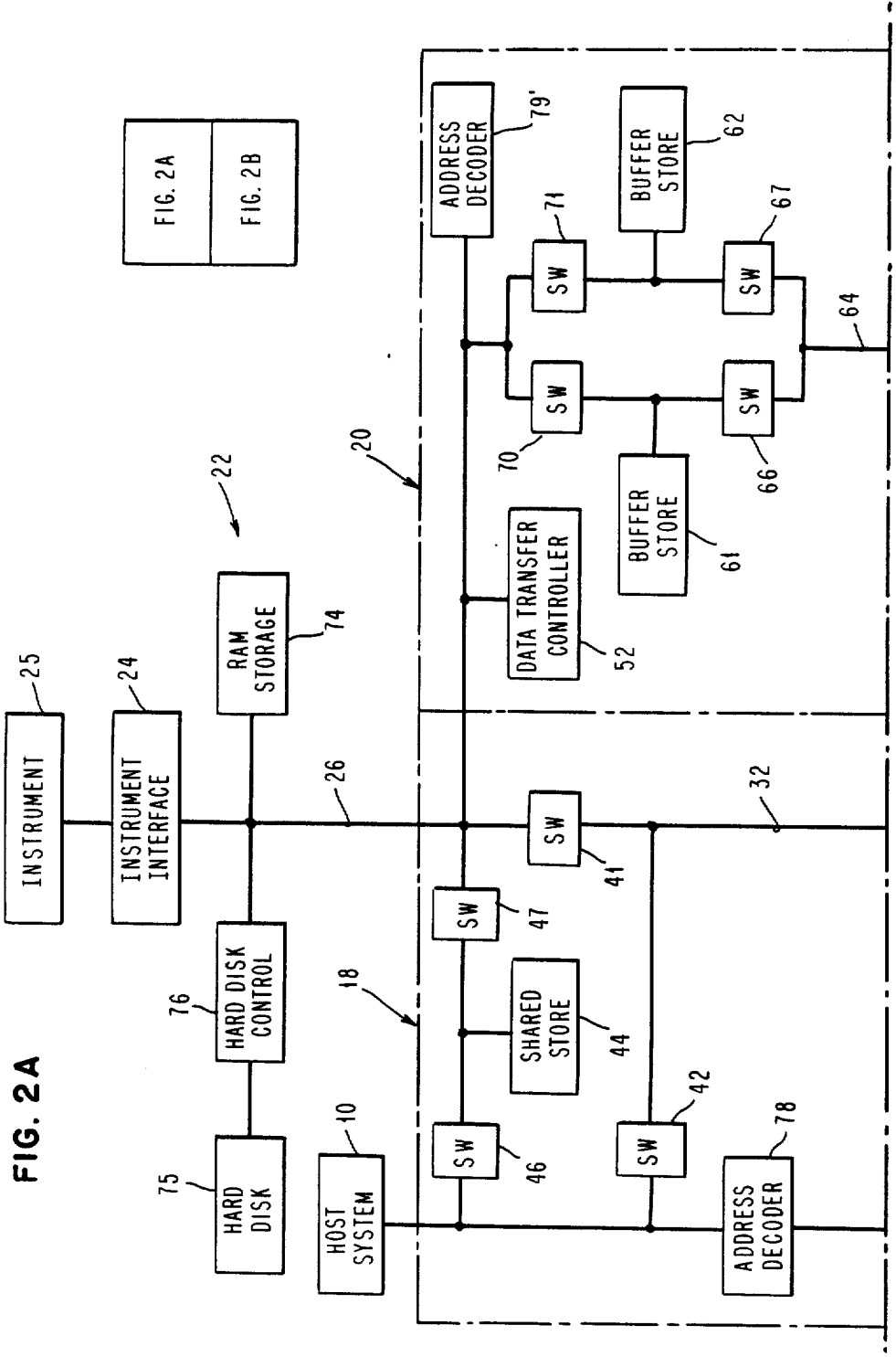
FIG. 2(A-B) is a more detailed schematic block diagram of the system of FIG. 1.
Figure 2B:
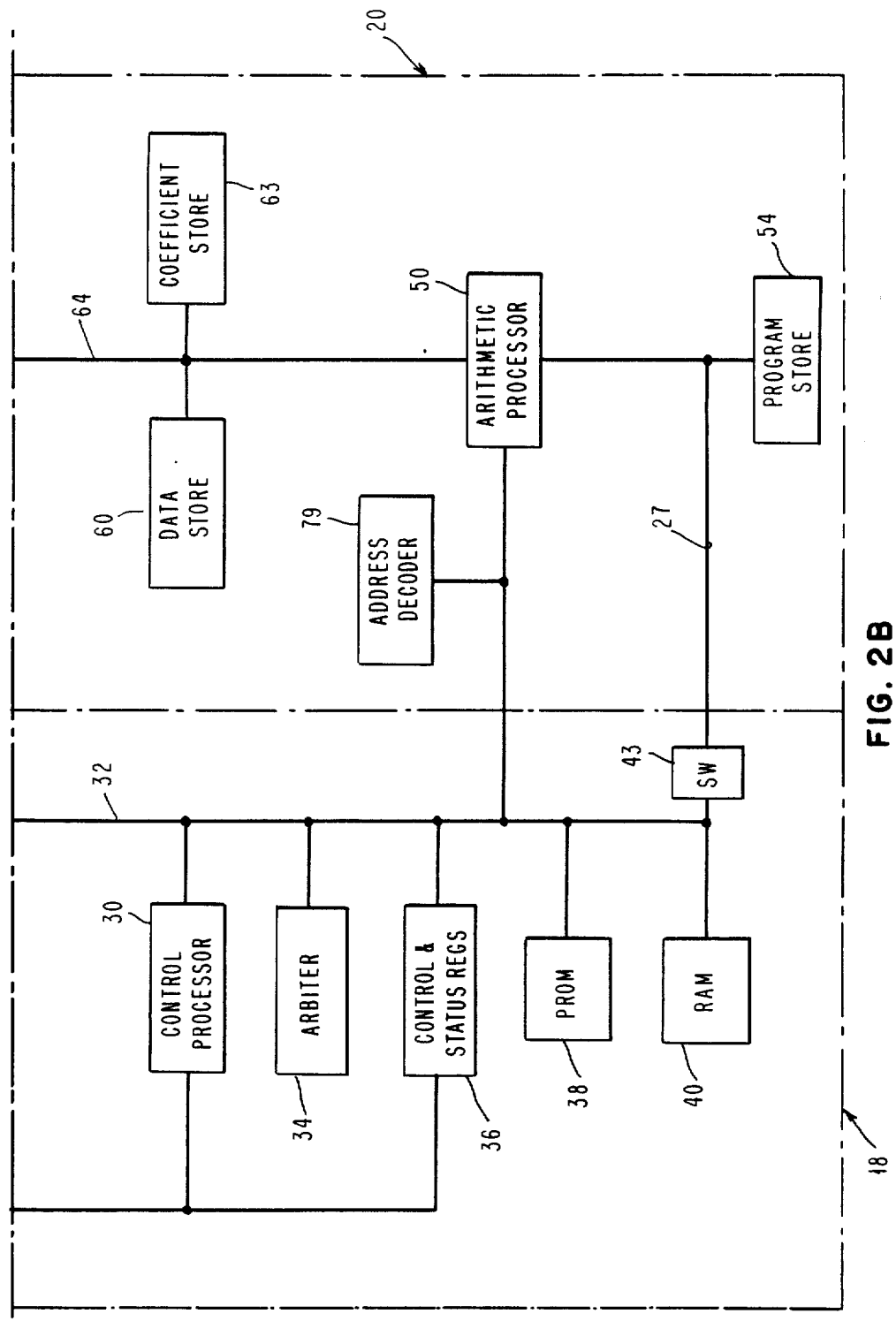

Referring now to FIG. 2, PCU 18 includes a control processor (CP) 30 connected by a bus 32, to an arbiter 34, a control and status register section 36, a programmable read only memory (PROM) 38, and a random access memory (RAM) 40. Except for the use of the control register providing software control over bus 32, as described in detail below, these hardware elements of PCU 18 are the same as corresponding elements of HS10, which are within the prior art and need not be described in detail. Thus, CP30 is a Motorola MC68000 Processor. Bus 32 is connected through selectively operable re-drivers or switches (SW) 41, 42 and 43 to other buses of the system. These switches function to either electrically isolate or to electrically connect bus 32 to the other buses and elements. It is to be understood that the various buses described herein include not only data and address lines but various control lines and that the switching function occurs on the address and data lines without affecting the control lines. Switch 41 connects the bus 32 to the above-mentioned bus 26. Bus 32 is considered an internal PCU bus and bus 26 is an external one. Together busses 26 and 32 form segments of their combination, i.e. each of busses 26 and 32 are segments of a larger bus formed by the combination of the two segments.

PCU 18 further includes a high speed shared store 44 connected to a bus 45 which in turn is connected to switches 46 and 47. Switches 46 and 47 are operated by signals from either host system 10 or PCU 18 allowing data, operands, instructions etc. to be written into and-/or read from store 44 by either the HS10, PCU 18 or AU20.

AU 20 includes two primary elements, an arithmetic processor (AP) 50 and a data transfer controller (DTC) 52. AP 50 executes programs stored in a program store 54 which is connected by a program bus 55 to AP 50 and to switch 43. PCU 10 loads programs in store 54 for operation of AP 50. A data bus 64 is connected to AP 50 and provides the various operands and data used in performing the array operations. Data bus 64 is separate from program bus 55 to allow overlapped fetching of operands and instructions. A data store 60 and a coefficient store 63 are connected to bus 64 inboard of a pair of ping-pong, or buffer stores 61 and 62. Data store 60 is used to store intermediate results, tables, control blocks, etc., while store 63 stores various coefficients used in array operations. Stores 61 and 62 are respectively connected by switches 66 and 67 to data bus 64 and are respectively connected by switches 70 and 71 to bus 26. Under the control of DTC 52 and AP 50, switches 66, 67, 70 and 71 are selectively actuated so that while one of stores 61 and 62 is inputting data into AP 50 for processing thereby, the other buffer can be outputting data via bus 26 into storage 22. Storage 22 is shown in more detail in FIG. 2, than in FIG. 1, as comprising a RAM storage 74 and a hard disk 75 connected through a hard disk control 76 to bus 26. The host system 10 is a memory mapped system in which the various elements are selected according to their addresses. To this end, address decoders 78, 79' and 79 are provided in PCU 18 and AU 20.

In the operation of the system as thus far described, array or vector operands are stored in storage 22. Such operands can come from data derived from instrument 25 or the operands can be loaded in such storage from the host system. HS10 initiates array operations by either down-loading a problem program into PCU 18 or by passing to PCU 18 a pointer indicating where the problem program is located in storage 22. Once the array operations are initiated, the host system is free to perform other operations, such as monitoring instrument 25, displaying data, outputting data into a printer or CRT or via communication lines to some other system. Problem programs are generally defined by means of a higher level language such as FORTRAN. By means of FORTRAN call statements, the individual array operations are initiated. To this end, PCU 18 breaks down the broadly defined array operations into programs that are passed into program store 54 for execution by AP 50 and into control block information that is passed to AP 50 and DTC 52 for respectively controlling program execution and transferring data between storage 22 and AU 20. By operating the various switches connected to the buses, the buses can be selectively electrically isolated or connected to provide a very high degree of overlapped data transfer operations. For instance, AP 50 can be receiving operands from store 61, processing them according to the desired operation and placing the results back in store 61. While this is going on, DTC 52 can be unloading store 62 with previously processed operands and placing them in storage 22 and thereafter loading store 62 with new operands for the next operations. PCU 18 can concurrently be setting up for the next operation by generating the necessary program and control information. Since the PCU 18 is the primary controller for the array processing, it should be obvious that the use of bus 32 over which the various data, addresses and control information passes is critically important to the successful operation of the system and it is in such environment that the invention is intended to operate. In the operation of the invention, arbiter 34 normally exercises hardware control over use of bus 32 and bus 26. However, by use of a software controlled register 85 (FIG. 3), the normal hardware control can be overriden so that through software or programs stored in RAM 40 the control register can be appropriately loaded to disable arbiter 34 and exercise control of use of bus 32 and bus 26.

Figure 3:
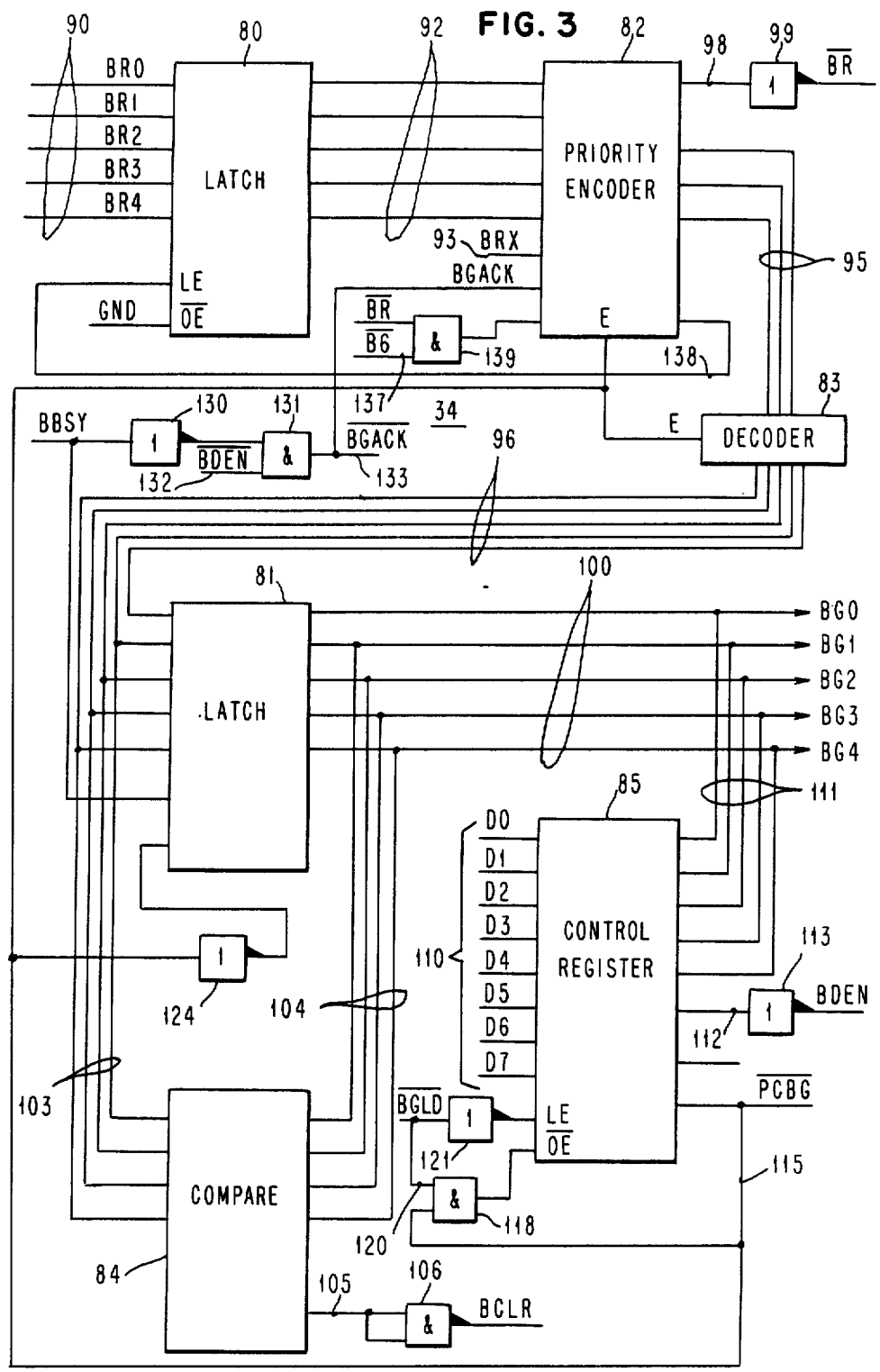
FIG. 3 is a schematic block diagram of the arbiter and control register, embodied in the system shown in FIGS. 1 and 2.

FIG. 3 shows details of arbiter 34 in conjunction with a control register 85 for providing hardware and software control over use of the bus 32 and bus 26. The arbiter includes latches 80 and 81, a priority encoder 82, a decoder 83, and a comparator 84, which, except for the disabling function due to operation of control register 85, operate in the same manner as the arbiter of the host system, which is within the prior art. The system is implemented in conventional TTL technology. Latch 80 has five input lines 90 which are connected to corresponding lines on bus 32 and receive bus request signals BR0–BR4 from different devices requesting use of the bus. Signals BR0–BR4 are prioritized with BR0 being the lowest. One or more devices may be daisy-chained and associated with the same level of bus request signals. Thus, in the general system shown in FIG. 2, BR0 is typically connected to a printer in host system 10, BR1 is associated with an RS 232 communications line in the host system and with instrument interface 24, BR2 is associated with a floppy disk in the host system, BR3 is associated with an IEEE 488 interface, and BR4 is associated with hard disk control 76 and DTC 52. The general rule on priority levels is that higher speed devices or lines have higher priority.

As is known, bus segments 32 and 26 operate in a cyclic fashion to transfer data, and the various bus request signals BR0–BR4 are received in an asynchronous fashion. Thus, in the operation of latch 80, there may be one or more active signals on lines 90 at any given time. The output of latch 80 is fed by five lines 91 as an input to a priority encoder 82. A line 93 is also connected as an input to encoder 82 for receiving a BRX signal from a control register in 36, indicating that the host system 10 desires to use bus 32. By convention, an active signal on line 93 is given a higher priority over signals on any of lines 91, by encoder 82. The output of encoder 82 is fed by three lines 95 to decoder 83 which is a three to eight decoder. When there is one or more active signals on lines 91 and 93, encoder 82 will produce a three bit code on line 95 indicating which bus request level of priority should be given control of the bus. From such three bit signal, decoder 83 provides a single active signal on one of output lines 96 in accordance with whichever of the bus request signals BR0–BR4 has the highest priority. Also, through output line 98 and inverter 99, an inactive bus request (BR) signal will drive the bus request line of bus 32 inactive whenever any one of lines 96 is active. Should a BRX signal be active on line 83, the output of decoder 83 will keep all of lines 96 inactive, regardless of the fact that there might be one or more active bus request signals, while at the same time an active output signal on line 98 will cause the bus request latch 80 load enable line LE to be disabled whenever BGACK is not in the active state.

Lines 96 are connected to inputs of latch 81 which, when enabled, provides a single active signal on one of five output lines 100, such signals being designated bus grant outputs BG0–BG4. A comparator 84 has four lines 103 connected to those ones of input lines 96 associated with signals BR1–BR4. Also fed as an input to comparator 84 via lines 104 are bus grant signals BG1–BG4. The purpose of comparator 84 is to sense any new higher priority input on one of lines 96 and compare it to the latched up output on one of lines 100. Should there be a higher bus request on one of lines 103, then comparator 84 generates an active signal on line 105 which is fed to NAND circuit 106 to generate a bus clear (BCLR) signal to indicate the pendency of a higher priority request in 90. The NAND circuit 106 functions as an inverter but is connected to provide an open collector drive on bus 32. The operation of arbiter 34 thus far described is the same as that of the prior art.

Control register 85 is an octal latch having input lines 110 receiving data signals D0–D7 from data lines in bus 32. Such data signals provide the software controlled operation previously described and are initially stored in RAM 40 to provide the desired operation as more fully described below. The output of register 85 includes five lines 111 which are respectively connected to lines 100 to provide bus grant signals BG0–BG4. An active data signal D0 will provide an active BG0, an active D1 will provide an active BG1, etc. Additionally, an active data signal D5 will provide an active signal on output line 112 which through inverter 113 provides the bus driver enable (BDEN) signal used to control the enabling of driver or switch 41. That is, BDEN controls the connection and isolation between buses 32 and 26.

An active bit on D7 produces a corresponding active signal on output line 115 which produces a program control bus grant (PCBG) signal. This signal is sent to a status register in 36 to indicate that a PCBG is in progress. It is also sent to the enable inputs E of encoder 82 and decoder 83 to thereby disable arbiter 34 and provide a masking function. The PCBG signal is further sent to AND circuit 118 the output of which is fed to the output enable input of register 85. It should be obvious that by use of only an active signal D7, control register 85 can thereby disable encoder 82 and decoder 83, to thereby disable the arbiter. If only bit D7 is active or is provided, the result is that bus request signals BR0–BR4 are masked and controller 30, which normally has the lowest priority, would thereby gain highest priority and can use the bus without having to give up priority to a normally higher priority requester. If in addition to bit D7, additional control or data bits D0–D4 associated with bus grant signals are provided, D7 has the effect of disabling the arbiter from applying bus grant signal to output lines 100 while enabling the control register to do so. This produces a mutually exclusive action between which of the two sources (arbiter 34 or register 85) of bus grant signals can be used to drive the output lines 100.

Line 115 is also connected to the input of inverter 124 whose output is connected to the output enable of latch 81. The presence of an active PCBG signal on line 115 disables the output of latch 81 so as to prevent the latch from driving the output lines 100 active. In order to load register 85, CP30 must first have control or mastership over bus 32. When it does, the control register 85 is addressed in usual fashion through a decoder within 30, to provide an active bus grant load (BGLD) signal on line 120 to enable register 85. The BGLD signal becomes active when the data lines 110 have valid data thereon so that such data is latched or stored in register 85. When BGLD goes active, AND gate 118 thereby drives its output line low to thereby enable the output of reg 85. When data bit D7 is loaded, line 115 goes active, is driven low, and the PCBG active signal fed into AND gate 118 thereby latches the output enable. This latched state is subsequently removed by loading register 85 without an active D7 bit.

In accordance with the prior art operation of CP30 during an arbitration procedure, when a device makes a request to use bus segment 32 and 26 by one of signals BR0–BR4, a bus request (BR) signal is sent to CP30 which then provides a BG signal. This causes one of BG0–BG4 to be sent to the requester. The requesting device then generates a bus busy (BBSY) signal to take over control of the bus. Such signal then produces a bus grant acknowledge (BGACK) signal that is sent to CP30 which then goes into a "dead" or disabled states until the requesting devices give up or relinquishes the bus.

A bus busy (BBSY) signal from bus 32 sets the latch enable input of latch 81. It is also inputted into an invert circuit 130 whose output is connected to an AND circuit 131. AND circuit 131 also receives an input BDEN signal on line 132. The output of AND circuit 131 on line 133 drives the BGACK signal line to CP30. When a bus grant signal is received by a requesting device, the normal BGACK signal disables CP30. When a software control bus grant is given for example to close switch 41, CP30 needs to stay alive i.e. not be disabled, and AND gate 131 drives the BGACK control line in bus 32 inactive so that CP30 remains enabled.

Line 133 is also connected to encoder 82 and operates in conjunction with the BR and BG signals on lines 136, 137 to provide a timing signal on the output line 138. Lines 136 and 137 input an AND gate 139 the output of which is inputted into encoder 82. Line 138 is connected to the latch enable (LE) input of latch 80. When both the BR and BG signals are exclusively active or when the BGACK signal is active, line 138 will be driven high to enable input to latch 80 whereby the output signals therefrom will change with changes in the BR0–BR4 signals. At time other than when the BR, BG and BGACK signals are different than those just described, the LE input will be disabled to thereby latch up the output signals from latch 80 and provide a stabilized output into the encoder.

In summary of the software controlled use of bus 32, control register 85 is loaded with a data bit D7 which generates a PCBG signal to disable arbiter 34. This action has the effect of masking out the bus request signals BR0–BR4 so that no requesting device can use the bus. When only an active data bit D7 is used, CP30 thereby gains full use of the bus. Data bit D7 can also be loaded when one of D0–D4 bits is loaded for generating an active state for one of the bus grant signals BG0–BG5. The effect of the combination of active bit D7 and one of the D0–D4 set is to disable the bus arbiter and to establish a condition where register 85 controls which device priority level is granted use of the bus. Data bit D5 controls the operation of switch 41 and thereby the connection between buses 32 and 26. Bit D5 can be used with or without the use of the other bits to produce the obvious results.

Those skilled in the art will recognize other applications for the invention and modifications in the preferred embodiment within the spirit of the invention and the scope of the claims.

Having thus described my invention, what I claim as new and desire to secure by Letters Patent is:

1. A data processing system comprising:
   a bus;
   a processor connected to said bus and exerting master control over the use of said bus;
   a plurality of requesting devices connected to said bus, each device being operative to send a bus request signal over said bus and to receive a bus grant signal from said bus; and
   hardware controlled bus arbiter means including a plurality of input lines connected to said bus for receiving bus request signals from said requesting devices, a plurality of output lines respectively connected to said bus for sending bus grant signals over said bus, and arbiting means for generating first bus grant signals, said arbiting means being responsive to a single bus request signal on one of said input lines for sending a first bus grant signal over said bus to the one of said requesting devices from which said single bus request signal was sent,
   said arbiting means being further operative in response to a plurality of simultaneous bus request signals on plural ones of said input lines for sending a single first bus grant signal on said bus to grant use of said bus to one of the requesting devices, from which such simultaneous bus request signals were sent, in accordance with a predetermined priority, the improvement comprising:
   storage means connected to said bus for storing a program controlling use of said bus which program includes predefined signals; and
   control means connected to said bus and being responsive to said predefined signals for generating second bus grant signals on a mutually exclusive basis relative to said first bus grant signals, said second bus grant signals being transmitted over said bus to said requesting devices;
   said processor being operative in response to execution of said program to transfer at least one of said predefined signals from said storage means over said bus to said control means to generate a single second bus grant signal granting use of said bus to a requesting device predetermined by such single second bus grant signal.

2. A data processing system in accordance with claim 1 wherein:
   said arbiting means is selectively disabled in response to receipt of a disabling signal;
   and said control means includes means responsive to one of said predefined signals for generating said disabling signal and transmitting said disabling signal from said control means to said arbiting means.

3. A data processing system in accordance with claim 2 wherein said control means comprises a control register having means for receiving said predefined signals as inputs and means for generating said second bus signals and said disabling signal as outputs.

4. A data processing system in accordance with claim 1 comprising:
   a second bus connected to said first-mentioned bus;
   selectively actuated switch means connected to said buses for controlling the transfer of data between said first-mentioned bus and said second bus;
   and means connected to said control means and to said switch means for controlling operation of said switch means in response to a signal from said control means.

5. A data processing system in accordance with claim 4 comprising:
   processing means connected to said second bus whereby actuation of said switch means allows either of said processing means and said processor to transfer data over both of said buses when said switch means is actuated and allows only said processing means to transfer data over said second bus at times other than when said switch means is actuated.

* * * * *